E. J. CANTWELL.
HAY STACKER.
APPLICATION FILED FEB. 14, 1921.
1,422,924.
Patented July 18, 1922.
3 SHEETS—SHEET 3.
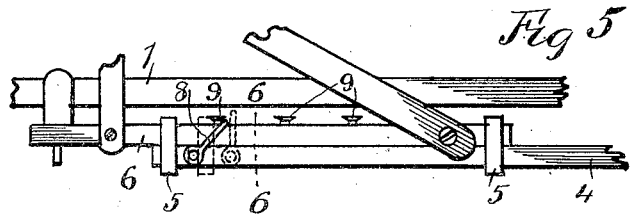
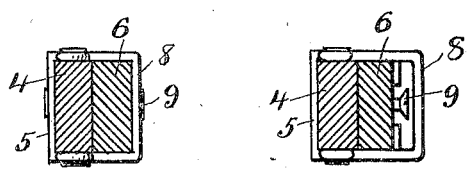
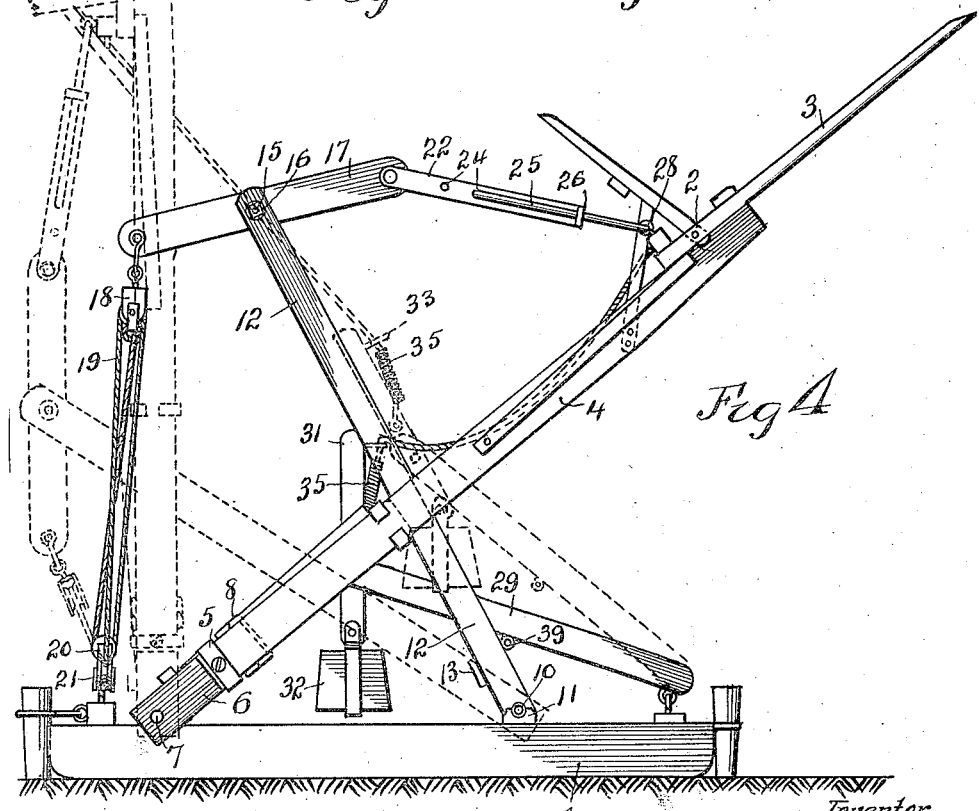
Witness:
R. E. Hamilton
Inventor,
Edward J. Cantwell
By Warren D. House
His Attorney

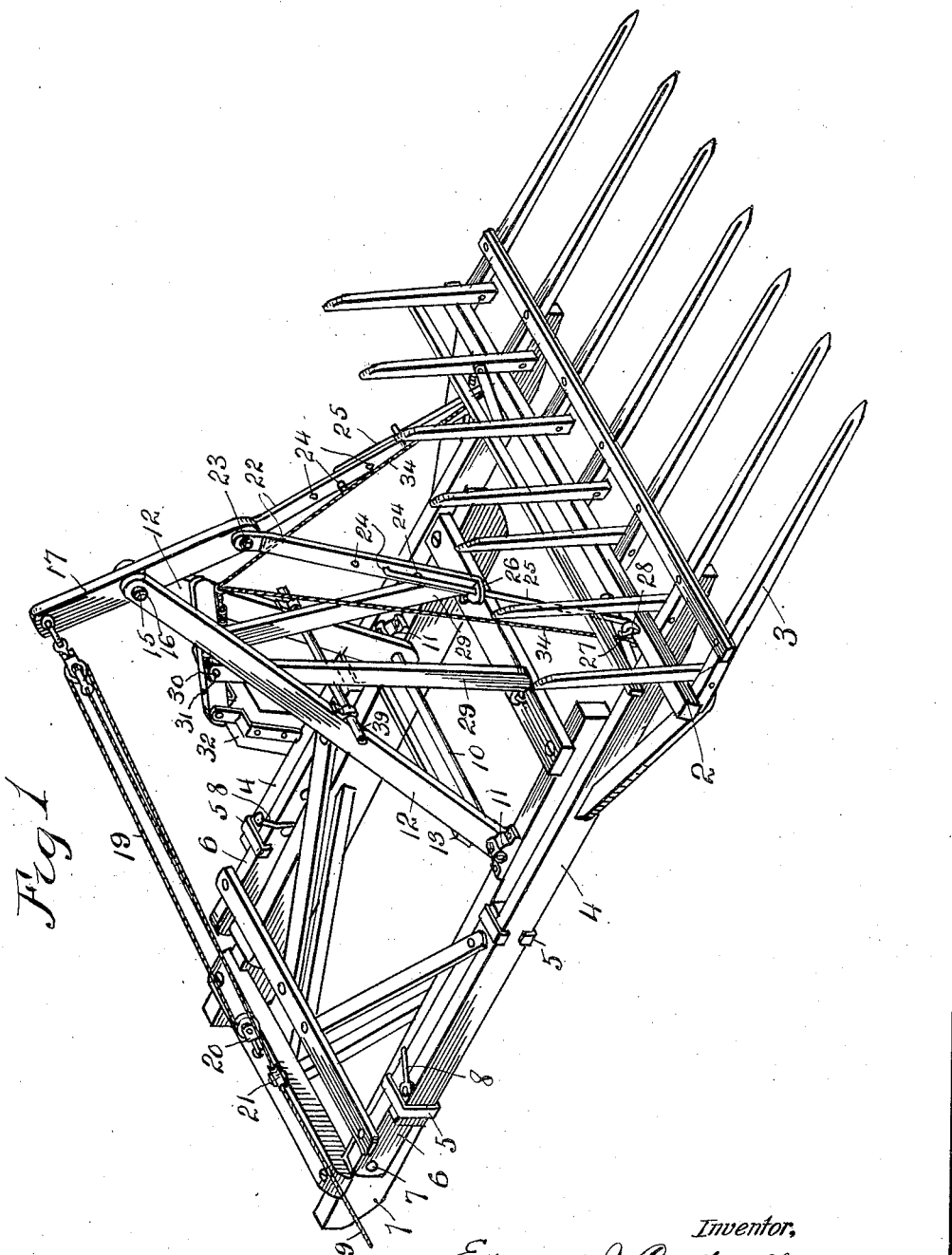

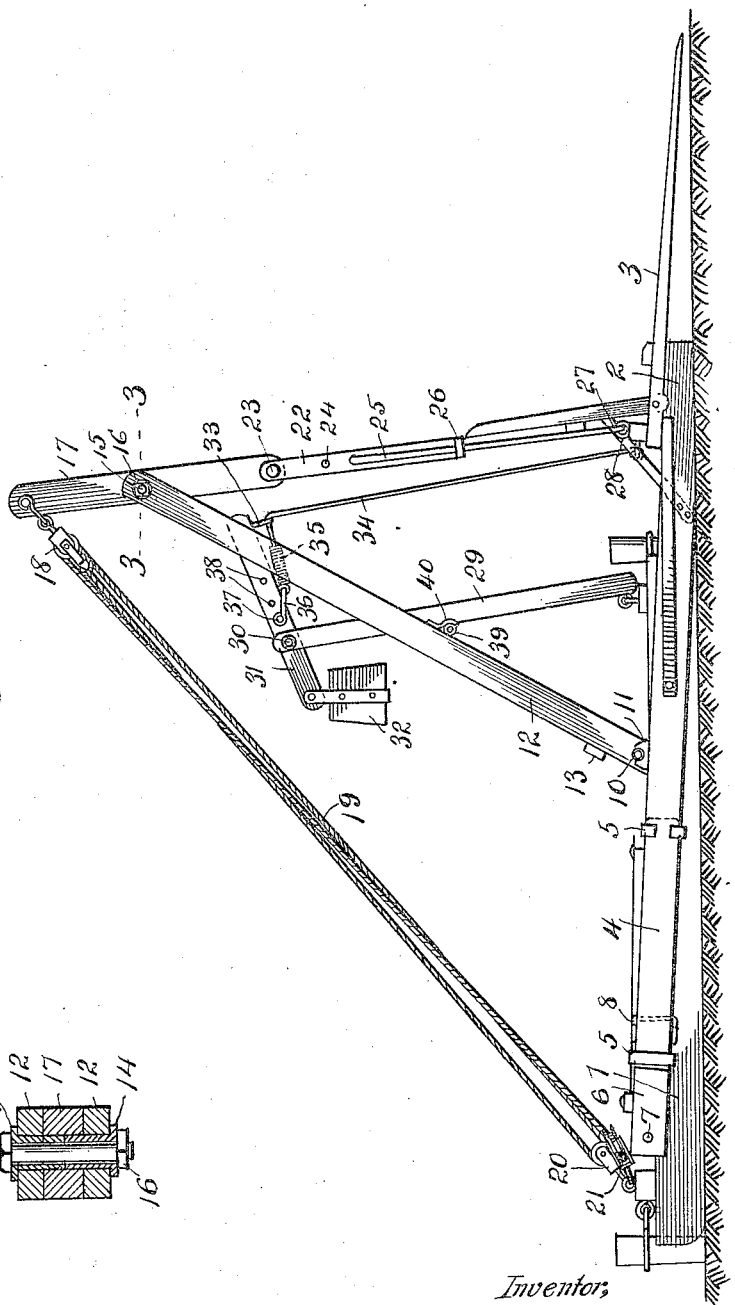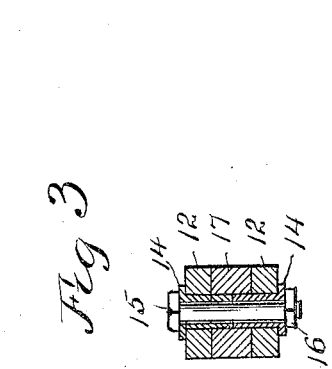

UNITED STATES PATENT OFFICE.

EDWARD J. CANTWELL, OF KANSAS CITY, MISSOURI.

HAY STACKER.

1,422,924.   Specification of Letters Patent.   Patented July 18, 1922.

Application filed February 14, 1921. Serial No. 444,672.

*To all whom it may concern:*

Be it known that I, EDWARD J. CANTWELL, a citizen of the United States, residing at Kansas City, in the county of Jackson and State of Missouri, have invented a certain new and useful Improvement in Hay Stackers, of which the following is a specification.

My invention relates to improvements in hay stackers.

The object of my invention is to provide a hay stacker, which is cheap to make, strong and durable, which is easy to operate, which is not liable to get out or order, which is simple in construction, which is arranged to resist shocks due to its operation, which may be rapidly operated, and which is efficient in operation.

My invention provides further novel counter balancing means for the fork frame, and novel means for swinging the latter.

The novel features are hereinafter fully described and claimed.

In the accompanying drawings, which illustrate the preferred embodiment of my invention, Fig. 1 is a prospective view of my improved hay stacker shown in the loading position.

Fig. 2 is a side elevation of the same.

Fig. 3 is an enlarged cross section on the line 3—3 of Fig. 2.

Fig. 4 is a side elevation of the hay stacker showing, in solid lines, the fork frame in an intermadiate position and in dotted lines in the unloading position.

Fig. 5 is a top view of a portion of one of the extensible fork arms and parts connected therewith.

Fig. 6 is an enlarged cross section on the line 6—6 of Fig. 5, showing the two members of the fork arm locked together.

Fig. 7 is a view similar to Fig. 6, showing the U-shaped locking member in the unlocked position.

Similar reference characters designate similar parts in the different views.

1 designates a horizontal base frame of any suitable construction. 2 designates a fork frame provided with the usual tines 3, and provided with two extensible arms each consisting of a rearwardly extending member 4 which is longitudinally slidable in guides 5 which are attached to an arm member 6 pivoted by a horizontal bolt 7 to the main frame 1.

Two U-shaped locking members 8 have their arms respectively pivoted to the members 4. Each locking member 8 is adapted to lockingly engage one or more pins 9 which extend inwardly from the adjacent member 6, the latter being embraced by the locking member 8. The members 8 engaging with the pins 9 prevent rearward movement of the members 4. By pulling the fork frame forwardly, the members 8 may be swung to the position shown in Fig. 7 so as to be released from the pins 9, when it is desired to extend or contract the fork arms.

For swinging the fork frame upwardly from the loading position shown in Figs. 1 and 2, to the unloading position shown in dotted lines in Fig. 4, I provide swinging means comprising, preferably, the following described parts:—

Pivoted to the base frame 1 by a transverse pipe 10 mounted in bearings 11 on the base frame is a swinging support comprising two upwardly converging bars 12, pivoted on the pipe 10 and connected with each other near their lower ends by a brace bar 13.

Extending through the bars 12 near the upper ends thereof are two tubes 14, Fig. 3, respectively, which abut against each other and are mounted on a bolt 15 provided with a nut 16. Pivoted on the tubes 14 between the bars 12 is a lever 17 to one end of which is attached a pulley block 18 in which is mounted an operating rope or cable 19, which is also connected with a pulley block 20 attached to the base frame 1 and has running engagement with a pulley 21 mounted on the base frame.

The other end of the lever 17 is connected by one or more links to the fork frame 2. These links, preferably, are extensible and contractable and consist each of a bar 22 pivoted to a bolt 23 and provided with a plurality of transverse holes 24 disposed in a longitudinal row and adapted each to receive the inwardly turned end of a bar 25, which is extended through a lateral projection 26 in the lower end of the bar 22. The lower end of each bar 25 has a hook 27 mounted in an eye 28 which pivotally connects the bar 25 with the fork frame.

When the rope 19 is drawn outwardly the required distance, the fork frame carrying its load of hay is swung to the unloading position, shown in dotted lines in Fig. 4, by means of the lever 17, supporting bars 12 and bars 22 and 25.

For counter balancing the fork frame and its load and for resisting its too rapid movement from the unloading to the loading position, counter balancing and braking means are provided consisting, preferably, of the following described parts:

An auxiliary support comprising preferably two upwardly converging bars 29 are pivoted at their lower ends to the base frame 1 and are connected at their upper ends by a transverse bolt 30 on which is pivoted between the bars 29 a second lever 31 which, at one end carries a counter balance weight 32. Mounted in the other end portion of the lever 31 is an eye 33 through which extend two ropes 34, the lower ends of which are attached to the fork frame 2 and the upper ends of which are attached to one end of a coil spring 35, the other end of which is attached to a clevis 36 mounted on a bolt 37 which is adapted to be inserted through any one of a longitudinal row of holes 38 provided in the lever 31 at the right of the bolt 30, as viewed in Fig. 2.

Braking means for resisting the swinging of the bars 12 forwardly may consist of a transverse pipe 39 which is rigidly attached to the bars 29 and which is adapted to bear against the forward sides of the bars 12. Secured to the front side of the bars 12 respectively are two members 40 which are adapted to limit the upward movement of the pipe 39 on the bars 12.

In the operation of the invention, the fork frame is disposed first in the loading position. After the load has been deposited on the fork tines 3, the rope 19 is pulled outwardly by any suitable means, as by horses, thus swinging the fork frame to the unloading position shown in dotted lines in Fig. 4. The spring 35 will prevent shock at the upper limit of movement of the fork frame. The weight 32 will counterbalance the load at the initial upward movement of the fork frame, and after the load has been discharged, the weight 32 will start the fork frame forwardly toward the loading position. After the fork frame has moved forwardly so that its weight will cause it to travel forwardly, the brake pipe 39 will bear against the bars 12 and will hold said bars from too rapid forward movement. By the time the fork frame reaches the loading position, the weight 32 will have been lifted. The weight 32 further serves to prevent the ropes or cables 34 getting slack, as the fork frame nears the horizontal. The ropes are thus prevented from getting caught in and interfering with the other parts of the rigging.

The links connecting the lever 17 with the fork frame may be changed as to length by springing the bars 25 out of the holes 24 occupied by them and re-inserting them in others of said holes.

As the stack grows in height, the fork arms may be extended to correspond in the manner already described.

I do not limit my invention to the structure shown and described, as many modifications, within the scope of the appended claims may be made without departing from the spirit of my invention.

What I claim is:—

1. In a hay stacker. a base frame, a fork frame pivoted thereto, a swinging support pivoted to the base frame, a lever pivoted to said support, a link connecting said lever and said fork frame, means for swinging said lever in one direction. an auxiliary support pivoted to the base frame and arranged to bear against the first named support for resisting the movement of the latter in one direction, a second lever pivoted to the auxiliary support, flexible means connecting one end of the second lever with the fork frame, and a counter balance weight carried by the other end of the second lever, substantially as set forth.

2. In a hay stacker, a base frame, a fork frame pivoted thereto, a swinging support pivoted to the base frame, a lever pivoted to said support, a link connecting said lever and said fork frame, means for swinging the lever in one direction to lift the fork frame, two bars pivoted to the base frame, braking means carried by said bars and engaging said support to resist the movement of the latter in one direction, a second lever pivoted to and between said bars, flexible means connecting one end of said second lever with said fork frame, and a counter balance weight carried by the other end of said second lever, substantially as set forth.

3. In a hay stacker, a base frame, a fork frame pivoted thereto, means for swinging said fork frame upwardly, an auxiliary support pivoted to the base frame, a lever pivoted to said support, flexible means connecting one end of said lever with said fork frame, a weight carried by the other end of said lever, and braking means carried by the auxiliary support and arranged to resist the movement of said swinging means in one direction, substantially as set forth.

4. In a hay stacker, a base frame, a fork frame pivoted thereto, means for swinging said fork frame upwardly, an auxiliary support pivoted to the base frame, braking means carried by said support for resisting swinging of said swinging means in one direction, a lever pivoted to said support, flexible means including a spring connecting one end of said lever with the fork frame, and a counter balance weight carried by the other end of said lever, substantially as set forth.

In testimony whereof I have signed my name to this specification.

EDWARD J. CANTWELL.